Figure 4:
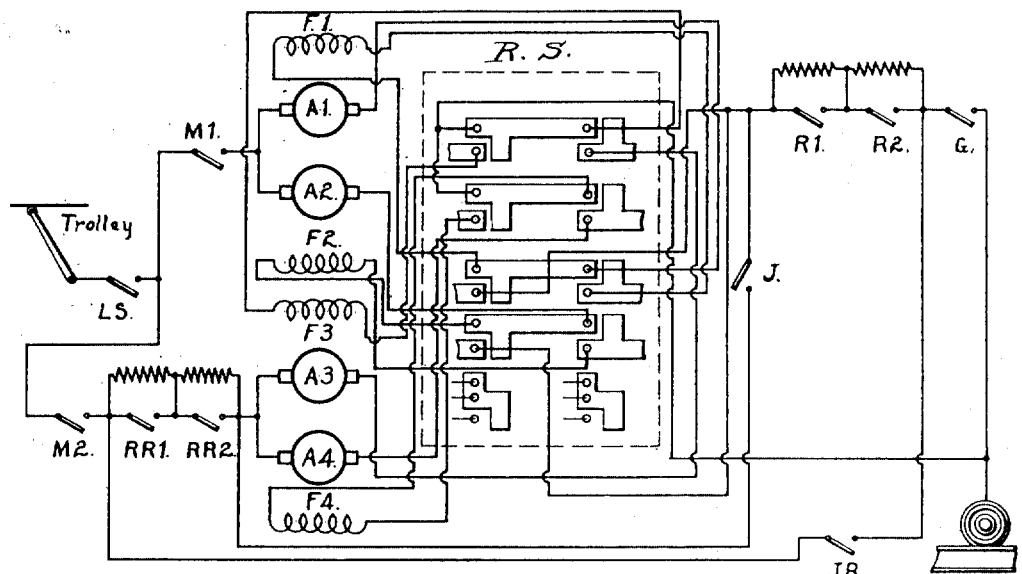

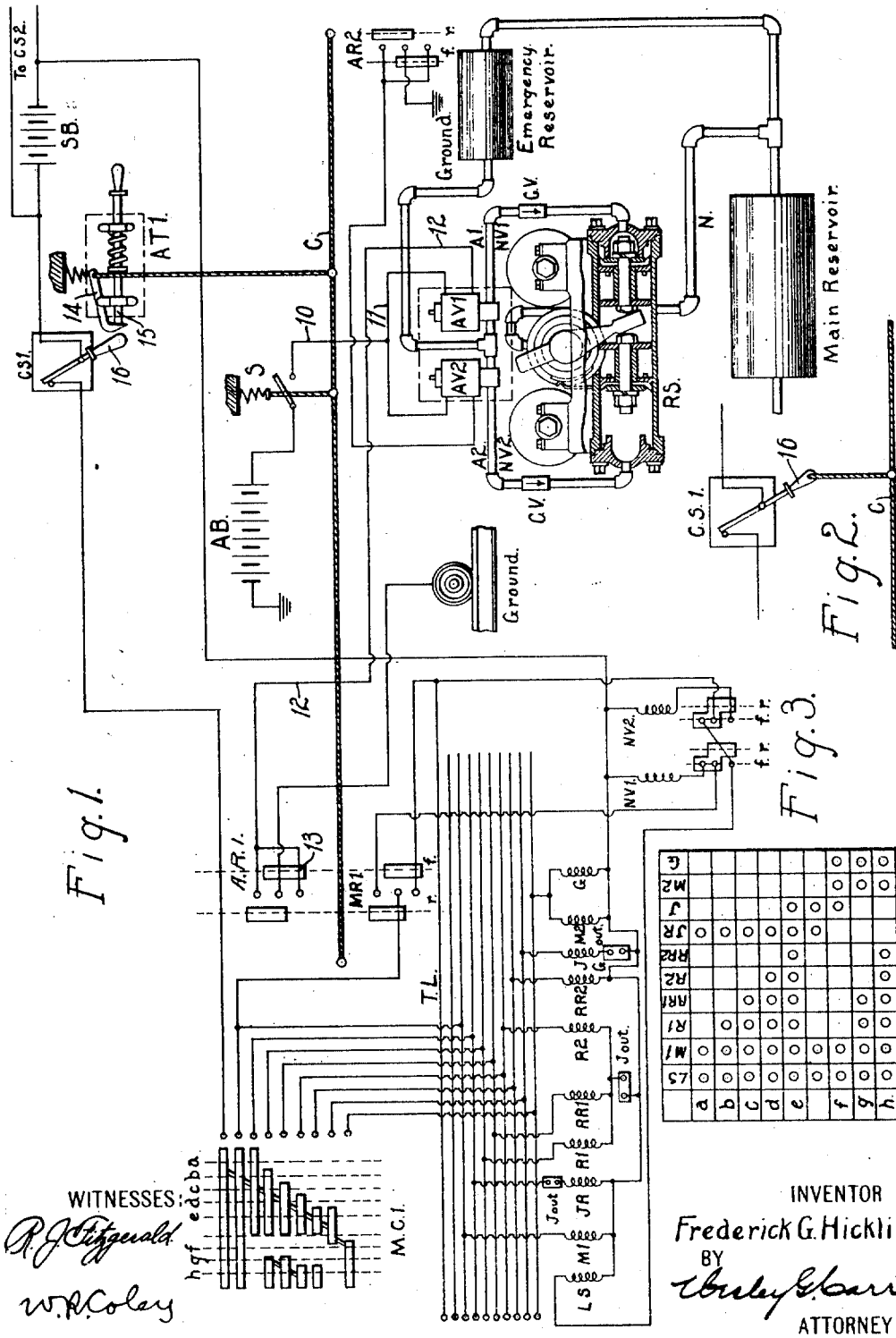

F. G. HICKLING.
CONTROL SYSTEM.
APPLICATION FILED JULY 11, 1914.

1,236,711.

Patented Aug. 14, 1917.
3 SHEETS—SHEET 2.

WITNESSES:
R. J. Fitzgerald
W. A. Coley

INVENTOR
Frederick G. Hickling.
BY
Wesley Sloan
ATTORNEY.

F. G. HICKLING.
CONTROL SYSTEM.
APPLICATION FILED JULY 11, 1914.
1,236,711.
Patented Aug. 14, 1917.
3 SHEETS—SHEET 3.
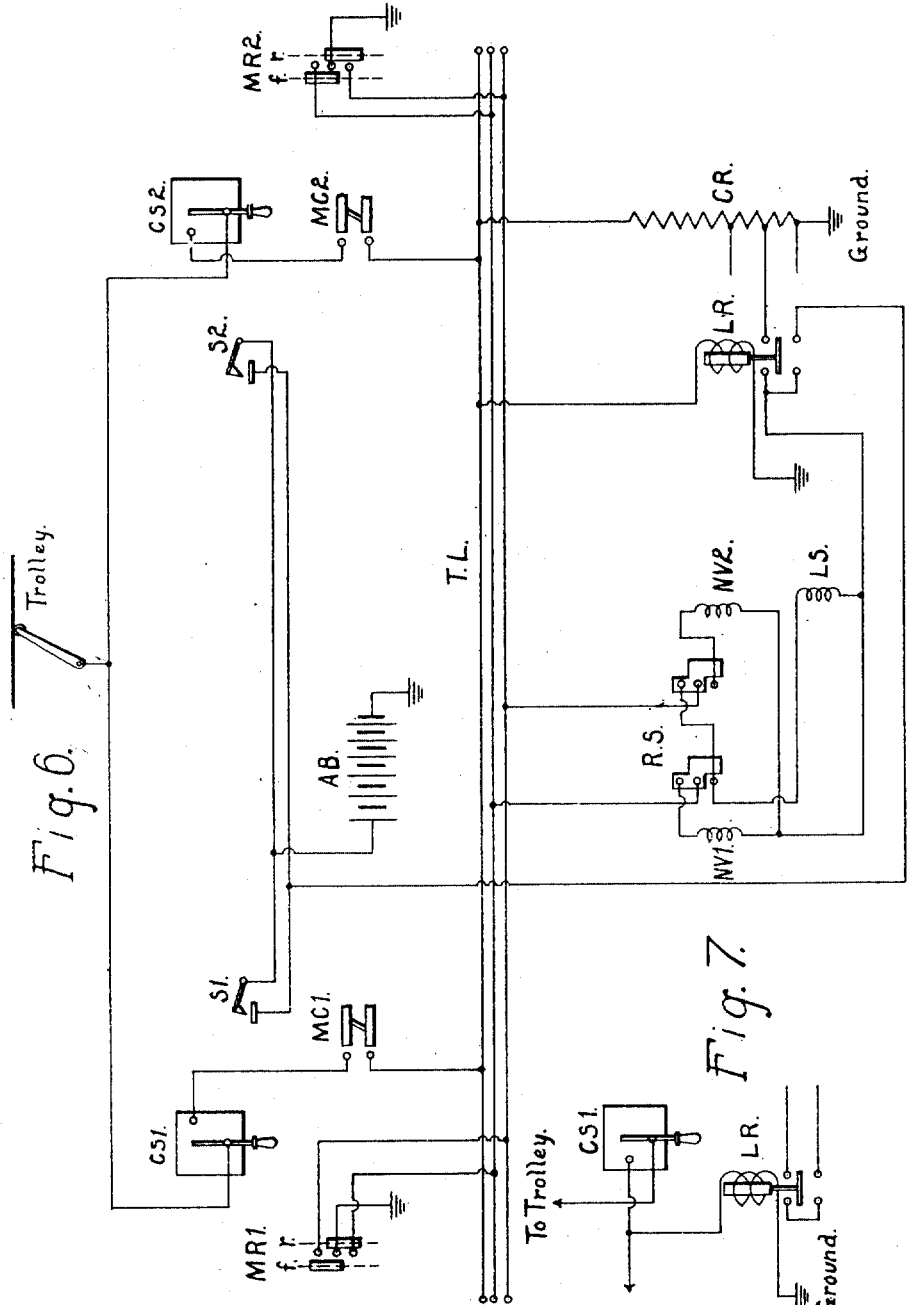
WITNESSES:
R. J. Fitzgerald
W. R. Coley
INVENTOR
Frederick G. Hickling
BY
Wesley G. Carr
ATTORNEY

UNITED STATES PATENT OFFICE.

FREDERICK G. HICKLING, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,236,711.   Specification of Letters Patent.   Patented Aug. 14, 1917.

Application filed July 11, 1914. Serial No. 850,322.

*To all whom it may concern:*

Be it known that I, FREDERICK G. HICKLING, a citizen of the United States, and a resident of Wilkinsburg, in the county of Allegheny and State of Pennsylvania, have invented a new and useful Improvement in Control Systems, of which the following is a specification.

My invention relates to systems of control for electric motors, and it has special reference to emergency dynamic braking systems for use in electric railway vehicles and the like.

The object of my invention is to provide, in a system of the above-indicated character, relatively simple and inexpensive means for effecting dynamic braking of a vehicle in emergencies, such as the failure of the supply circuit voltage or of the air brakes, or inadequacy of the manually-operated brakes, whereby the vehicle may be readily retarded and brought to rest or its speed maintained below a dangerous value when the vehicle is descending a grade.

In control systems of the class to which my invention is applicable, namely, those embodying one or more pairs of motors that are permanently connected in parallel circuit relation, it is possible to set up dynamic braking by simply actuating the main circuit reverser to its reverse position, a practice which is followed to a greater or less extent in various purely hand-controlled systems, which do not employ an auxiliary control circuit embodying a plurality of electrically-governed switches which are energized in accordance with a predetermined sequence from the auxiliary control circuit. Also, in the latter type of system, it has been possible to set up dynamic braking by throwing the master reverser to its reverse position and moving the master controller temporarily to its first notch, whereby the main circuit reverser was actuated to its reverse position to thereupon inaugurate dynamic braking. However, it will be appreciated that, in case of failure of the supply circuit voltage, or of similar emergencies, it has been impossible to dynamically brake the vehicle, and it is to provide an auxiliary system for use in such emergencies that my invention is designed.

In a co-pending application of Clarence Renshaw, Serial No. 854,093, filed July 30, 1914, and assigned to the Westinghouse Electric & Manufacturing Company, an emergency dynamic braking system employing entirely fluid-pressure controlling and operated means is disclosed.

According to my present invention, I provide auxiliary electric means, comprising a battery or other source of electrical energy of relatively small capacity and means located at the respective ends of the vehicle for connecting the battery to either the regular electrically-governed fluid-pressure controlling valves of the main reverser or to auxiliary valves of a similar type. Simultaneously, certain switches are automatically opened to disconnect the motors from the supply circuit. In this way, the reverser is readily and inexpensively operated, and dynamic braking is thereupon set-up to retard and stop the vehicle or to maintain it at a safe speed in case of descending a grade.

In the accompanying drawings, Figure 1 is a diagrammatic view of an auxiliary apparatus constructed in accordance with my invention combined with an auxiliary control system of a well-known type; Fig. 2 is a diagrammatic view of a preferred modification of a portion of the apparatus shown in Fig. 1; Fig. 3 is a chart of a well-known type illustrating the sequence of operation of the various motor-controlling switches shown in Fig. 4, which is a diagrammatic view of the main circuits of a control system of a class to which my invention is applicable; Fig. 5 is a sectional detail view of a portion of the switches which are preferably employed in my system; Fig. 6 is a diagrammatic view of a modified control system embodying my invention; and Fig. 7 is a diagrammatic view of a modification of a portion of the system illustrated in Fig. 6.

Referring to Fig. 1 of the drawing, the apparatus here shown comprises a master controller MC¹ which is adapted to occupy a plurality of motor-controlling positions *a* to *h*, inclusive, and a master reverser MR¹ that is adapted to occupy an "off", a "forward" and a "reverse" position, said devices being preferably located at one end of a railway vehicle (not shown) which has corresponding pieces of apparatus at the other end thereof; the actuating coils of the various motor-controlling switches shown in Fig. 3; a plurality of train line conductors TL for connecting the master controllers and master reversers to the actuating coils which may be disposed on one or more associated vehicles; and auxiliary source of electrical energy, such as a storage battery SB, for supplying energy to the master controller through a switch CS¹ and a corresponding switch CS² (not shown), respectively, a main circuit reverser RS of a familiar fluid-pressure operated drum type, which is provided, at its respective ends, with electrically - governed, fluid - pressure controlling valves NV¹ and NV² and auxiliary valves of a similar type AV¹ and AV²; a main source of fluid-pressure marked "Main reservoir" and a second, auxiliary source marked "Emergency reservoir"; a second auxiliary source of electrical energy AB of respectively small capacity, such as a battery of dry cells; a switch S, which is biased to the open position for connecting the battery AB to the auxiliary valves AV¹ or AV², under predetermined conditions; an auxiliary tripping device AT¹ that is normally biased to an inoperative position and is adapted to actuate the control switch CS¹ to its open position, under predetermined conditions; a similar device AT² that is correspondingly associated with the control switch CS² (not shown); a device, such as a bell cord C, which preferably extends the length of the vehicle and is adapted, when actuated, to operate the switch S and the auxiliary tripping device AT¹; and a plurality of multi-position switches AR¹ and AR² which are preferably associated and movable with the corresponding master reverser.

In Fig. 2, a branch of the bell cord C is shown as directly attached to the movable contact member 16 of the control switch CS¹, thereby permitting the elimination of the device AT¹, as hereinafter described. A simple and preferred construction is thus obtained.

Figure 5:
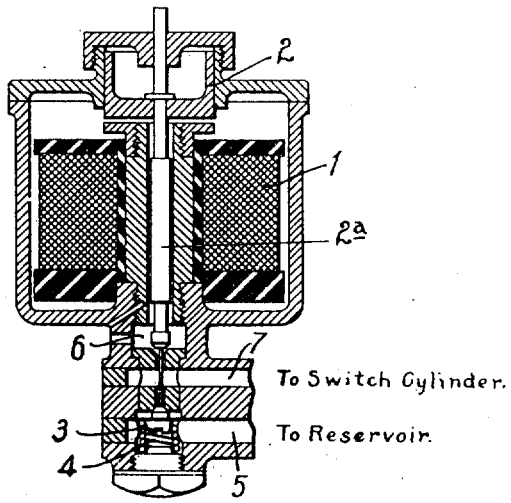

In Fig. 4, the main circuits shown comprise a supply circuit conductor marked "Trolley"; a return circuit conductor, such as a track rail, marked "Ground"; a plurality of electric motors respectively having armatures A¹, A², A³ and A⁴ and field magnet units F¹, F², F³ and F⁴; a plurality of motor-controlling switches LS, M¹, M², JR, J and G; a plurality of resistors which are respectively adapted to be short-circuited by switches R¹, R², RR¹ and RR²; and a main circuit reverser switch RS, preferably of the drum type, but here shown developed into a single plane, for simultaneously reversing the electrical relations of all of the field windings with respect to the corresponding armatures. It should be noted that the motors are connected in pairs in permanent parallel relation, thereby forming a local circuit which is adapted for dynamic braking, upon the reversal of the field windings, without further manipulation of the circuits. The motors are preferably mounted on any suitable type of railway vehicle in the usual manner, which, for purposes of simplicity, is not specifically shown.

Referring now to Fig. 1, which illustrates the preferred form of electrically-governed fluid-pressure controlling switches employed in the systems illustrated in Figs. 1 and 3, the construction here shown comprises, briefly, an energizing coil 1, which is adapted to actuate a movable armature 2ᵃ and a mechanically associated centrally - disposed magnetizable core 2, to the lower end of which a valve 3 is secured and is biased by a spring 4 to close a passage 5 which communicates with the reservoir; and an exhaust chamber 6 which is normally in communication with a passage 7 leading to the operating cylinder of the corresponding switch.

The operation of the valve may be described as follows: Upon energization of the coil 1, the core 2 and the associated valve 3 are moved downwardly to admit fluid-pressure from the passage 5 to the passage 7; simultaneously communication between the passage 7 and exhaust chamber 6 is closed. When the coil 1 is deënergized, the spring 4 actuates the valve 3 to its upper position which is shown in the drawing.

Inasmuch as the auxiliary control system shown in Fig. 1 and the associated main system of Fig. 4 are old and familiar in the art, no detailed description thereof is deemed necessary. As indicated in the sequence chart of Fig. 3, the pairs of permanently parallel-connected motors are first disposed in series-circuit relation with all of the accelerating resistors, which are then gradually short-circuited to effect acceleration of the motors. The pairs of motors are then changed over to parallel-circuit relation by means of the familiar "bridging" transition, the resistors being again in circuit initially. The resistors are then excluded from circuit gradually and successively to dispose the motors in full parallel relation.

The operation of the auxiliary apparatus shown in Fig. 1 may be described as follows: Assuming that the vehicle is traveling at or above a predetermined speed and that it is desired, for any reason, to dynamically brake the vehicle by means of the emergency system illustrated, the bell cord C may be operated from either end of the vehicle to close the switch S and to actuate the auxiliary tripping device AT¹. By the closure of the switch S, a circuit is completed from one side of the auxiliary battery AB through the switch S, conductor 10, where the circuit divides, the active branch including conductor 11, the actuating coil of auxiliary valve AV¹, conductor 12, contact member 13 of the multi-position switch AR¹, provided that the mechanically associated master reverser MR¹ occupies either of its operative positions, back to the other, preferably grounded, side of the battery AB. The other circuit leading from the conductor 10, through the auxiliary valve AV² and the other multi-position switch AR², is open in the latter switch, by reason of the customary practice of moving the controller and reverser on the rear platform of the vehicle to the "off" position and which are, therefore, temporarily not employed in operating the vehicle. Upon the energization of the valve AV¹, fluid-pressure is admitted from the emergency reservoir, through valve AV¹, a pipe A¹ and a suitable check valve CV to the operating cylinder of the main reverser RS. In this way, only the proper auxiliary valve can be energized and the main reverser is, therefore, thrown to its reverse position to set up dynamic braking of the vehicle.

The actuation of the bell cord C also operates a lever 14 of the auxiliary tripping device AT¹, to permit a spring-operated rod 15 thereof to strike the movable contact member 16 of the control switch CS¹ and move the member to its "off" position, thereby deënergizing the actuating coils of the various motor-controlling switches and disconnecting the motors from the supply circuit; or, as indicated in Fig. 2, the pull on the bell cord C directly actuates the control switch CS¹.

Normal operation of the reversing switch RS is effected by admission of fluid-pressure directly from the main reservoir through pipe N and the one or the other of the valves NV¹ and NV², upon energization thereof, in accordance with usual practice.

Reference may now be had to the modified system of Fig. 6, the system illustrated comprising suitable master controllers MC¹ and MC²; master reversers MR¹ and MR²; control switches CS¹ and CS², which are preferably located at the respective ends of the vehicle; a control resistor CR which is connected across the supply circuit and from which intermediate taps serve to conduct current of a lower voltage to the actuating coils of the various motor-controlling switches, such as are illustrated in Fig. 1, and which, for purposes of simplicity, are omitted from this figure; and a line relay LR which is energized from one of the train line conductors TL when either master controller occupies an operative position, whereby a circuit is completed from the control resistor CR to the actuating coil of the switch LS, forming part of the control circuits shown in Fig. 1. Consequently, upon the failure of supply circuit voltage, the line relay drops to its lower position thereby transferring the magnet coils NV¹ or the coils NV² from the supply circuit voltage to the auxiliary source AB and opening the switch LS to disconnect the motors from the supply circuit, thus performing a function similar to that of the auxiliary tripping device AT¹ illustrated in Fig. 1.

Switches S¹ and S² are provided, preferably at the respective ends of the vehicle, for connecting the battery AB to either the coil NV¹ or the coil NV², as the case may be, dependent upon the direction of travel of the vehicle. It will be observed that, in the present system, the actuating coils of the main reverser and the master reverser that are employed during normal operation of the system are also employed for emergency braking operation. The coils NV¹ and NV² in this case, however, will necessarily be of a slightly different design from those always energized through the control resistor because of the relatively low voltage delivered by the battery AB. It has been found, however, that the operation of the reverse drum from the control resistor, during normal conditions, is of a sufficiently brief period to obviate any possible damage or undesirable conditions in the energization of the coils.

The operation of the system shown will be evident from the drawings. Upon actuation of either the switch S¹ or the switch S², the proper coil NV¹ or NV² of the reversing switch RS is energized to admit fluid-pressure to the operating cylinder of the reverser, which is thereby actuated to its reverse position to cause the pairs of motors to dynamically brake the vehicle.

In Fig. 7, the line relay LR is connected directly to the control switch CS¹ instead of on the ground side of the master controller, as illustrated in Fig. 5. Either connection of the line relay may be employed, according to predetermined operating conditions.

I do not wish to be restricted to the specific circuit connections or arrangement of parts herein set forth, as various modifications thereof may be made within the spirit and scope of my invention. I, therefore, desire that only such limitations shall be imposed as are indicated in the appended claims

I claim as my invention:

1. In a system of control, the combination with an electric motor provided with a field-magnet winding and an armature, control means for reversing the electrical relations of said field winding and the armature, a fluid-pressure means for operating said control means, and electrical means normally employed for controlling said fluid-pressure means to operate said control means to positions for rotating the motors in a forward and a reverse direction, of auxiliary electrical means for controlling said fluid-pressure means to operate the control means to the reverse position under conditions to set up dynamic braking when the motor is momentum driven.

2. In a system of control, the combination with a plurality of electric motors provided with field windings and armatures forming a closed circuit, a fluid-pressure-operated means for varying the electrical relations of the field winding and armature of each motor, and electrical means normally employed for controlling the operating said first named means to positions for rotating the motors in a forward or a reverse direction, of auxiliary electrical means for operating said first named means to the reverse position under conditions to set up dynamic braking when the motors are momentum driven.

3. In a system of control, the combination with a supply circuit, a railway vehicle adapted to be driven by a plurality of electric motors provided with field windings and armatures forming a closed circuit, main circuit resistors, a plurality of motor-controlling switches, including resistor short-circuiting switches, for effecting acceleration and normal operation of the motors, a plurality of actuating magnet coils for said switches, a controller for governing the energization of said coils, a switching device for connecting said supply circuit to said controller, and an electrically-controlled, fluid-pressure operated device for reversing the electrical relations of the field winding and armature of each motor, of an auxiliary source of electrical energy, and means adapted for operation from the respective ends of the vehicle for effecting the opening of said switching device and for causing the energization of said reversing means from said source of energy to thereupon set up dynamic braking.

4. In a system of control, the combination with a plurality of electric motors provided with field windings and armatures forming a closed circuit, and electrically-controlled, fluid-pressure operated means for reversing the electrical relations of the field winding and armature of each motor during normal operation, of auxiliary electrically-controlled, fluid-pressure operated valves for effecting said reversing, an auxiliary source of energy, and means located at a plurality of points in the system for connecting said source to said auxiliary means to effect said reversing and to thereupon set up dynamic braking when the motors are momentum driven.

5. In a system of control, the combination with a railway vehicle adapted to be driven by a plurality of electric motors provided with field windings and armatures forming a closed circuit, and electrically-controlled, fluid-pressure operated means for reversing the electrical relations of the field winding and armature of each motor during normal acceleration, of auxiliary electrically-controlled, fluid-pressure operated valves for effecting said reversing, an auxiliary source of energy, and means located at the respective ends of the vehicle for connecting said source to said auxiliary means to effect said reversing and to thereupon set up dynamic braking when the motors are momentum-driven.

6. In a system of control, the combination with a plurality of electric motors provided with field windings and armatures forming a closed circuit, a device for reversing the electrical relations of the field winding and the armature of each motor, electrically-governed, fluid-pressure controlling valves for operating said device, and a main source of energy for normally energizing said valves, of an auxiliary source of energy of relatively small capacity, and means located at a plurality of points in the system for connecting said source to said valves to effect said reversing and to set up dynamic braking when the motors are momentum-driven.

7. In a system of control, the combination with a railway vehicle adapted to be driven by a plurality of electric motors provided with field windings and armatures forming a closed circuit, a device for reversing the electrical relations of the field winding and the armature of each motor, electrically-governed, fluid-pressure controlling valves for operating said device, and a main source of energy for normally energizing said valves, of an auxiliary source of energy of relatively small capacity, and switching means located at the respective ends of said vehicle for connecting said source to said valves to effect said reversing and to set up dynamic braking when the motors are momentum-driven.

8. In a system of control, the combination with an electric motor provided with a field-winding and an armature, a device for connecting the field winding in the one or the other direction to the armature, and plural means for operating said device to make the one or the other connection, of auxiliary electrical means for effecting the actuation of one of said plural means to set up dynamic braking when the motors are momentum-driven, and means for preventing the simultaneous action of the other of said plural means.

9. In a system of control, the combination with a plurality of electric motors provided with field windings and armatures forming a closed circuit, a device for connecting the field windings in the one or the other direction with respect to the armatures, and plural fluid-pressure operated means for operating said device to make the one or the other connection, of auxiliary electrical means adapted to be operated from a plurality of points in the system for effecting the operation of one of said plural means to set up dynamic braking when the motors are momentum-driven, and multi-position switching means connected to said electrical means and respectively located near said points and normally occupying an operative and a non-operative position, respectively, whereby said device can be operated only in the proper manner.

10. In a system of control, the combination with a railway vehicle adapted to be driven by a plurality of electric motors provided with field windings and armatures forming a closed circuit, a reverser for connecting the field windings in the one or the other direction with respect to the armatures to govern the direction of vehicle movement, and a pair of electrically-governed, fluid-pressure controlling valves for operating said device in the one or the other direction, of auxiliary electrical means adapted to be operated from the respective ends of the vehicle for effecting the actuation of said device to set up dynamic braking when the motors are momentum-driven, and a plurality of switching means connected in circuit with said electrical means and said valves and located at the respective ends of the vehicle and normally occupying an operative and an "off" position respectively, according to the direction of vehicle travel, whereby only the proper valve may be actuated.

11. In a system of control, the combination with a supply circuit, a railway vehicle adapted to be driven by a plurality of electric motors provided with field windings and armatures forming a closed circuit, a plurality of motor-controlling switches, a plurality of actuating magnet coils for said switches, a master controller at each end of the vehicle for governing the energization of said coils, a main circuit reverser for connecting the field windings in the one or the other direction with respect to the armatures to govern the direction of vehicle movement, a pair of electrically-governed, fluid-pressure controlling valves for operating said device in the one or the other direction, and a master reverser at each end of the vehicle for governing the operation of said valves, of an auxiliary source of electrical energy for the valves, means adapted to be operated from the respective ends of the vehicle for effecting the operation of said device to thereupon set up dynamic braking when the motors are momentum-driven, and a plurality of multi-position switching means connected in circuit with said source of energy and said valves and respectively located on said master reverser which normally occupy an operative and an "off" position, respectively, according to the direction of vehicle travel, whereby only the proper valve may be actuated.

In testimony whereof, I have hereunto subscribed my name this 30th day of June, 1914.

FREDERICK G. HICKLING.

Witnesses:
C. C. WHITTAKER,
B. B. HINES.